United States Patent Office

3,052,717
Patented Sept. 4, 1962

3,052,717
PREPARATION OF FLUOROCARBON
ACID FLUORIDES
John Francis Regan, Wilmington, Del., assignor to E. I. du Pont de Nemours and Company, Wilmington, Del., a corporation of Delaware
No Drawing. Filed July 13, 1959, Ser. No. 826,425
4 Claims. (Cl. 260—544)

The process of the present invention relates to the preparation of oxygen-containing, fluorinated compounds and, more particularly, to the preparation of fluorocarbon carboxyl compounds from tetrafluoroethylene.

Fluorocarbon carboxyl compounds, such as fluorocarbon acid salts and esters, find utility as surface-active agents and as chemical intermediates in the preparation of perfluorinated olefins through decarboxylation. The preparation of completely fluorinated carboxylic acid compounds has been heretofore generally accomplished by the electrolytic fluorination of the corresponding hydrocarbon compound. This, however, is an expensive and commercially unattractive method.

It is, therefore, the principal object of the present invention to provide an economic method for the preparation of fluorocarbon acids and derivatives thereof. Other objects will become apparent hereinafter.

The objects of the present invention are accomplished by a process which comprises contacting a mixture of tetrafluoroethylene and a compound selected from the class consisting of sulfur dioxide and nitrous oxide with a catalyst selected from the class consisting of active carbon, cobalt trifluoride and chlorine trifluoride, at a temperature of 100° to 550° C., but preferably between 400° and 550° C., and recovering fluorocarbon acid fluorides having four or more than four carbon atoms. According to the present invention, fluorocarbon carboxyl compounds are obtained by passing a mixture of tetrafluoroethylene and either sulfur dioxide or nitrous oxide, but preferably sulfur dioxide, into a reaction zone, such as a tubular reactor, maintained at a temperature of 400° to 550° C. In the reaction zone the mixture is contacted with a free radical-forming catalyst. In view of the extremely high temperatures, the choice of catalysts available is relatively limited. However, activated carbon, which is believed to form or cause the formation of free radicals at these temperatures, is a highly suitable and preferred catalyst. Other suitable catalysts are chlorine trifluoride and cobalt trifluoride. These are free radical catalysts which are preferably employed at the lower temperatures disclosed.

The nature of the reaction that occurs with the carbon catalyst appears to be a combination of polymerization and oxidation resulting in a larger variety of fluorocarbon acid fluorides in which the carbon number varies from four carbon atoms to relatively high molecular weight solid carboxylic compounds. Surprisingly, however, fluorocarbon acid fluorides having both even and odd numbers of carbon atoms are formed. Depending on the reaction conditions, either a preponderance of liquid fluorocarbon acid fluorides having from about four to twelve carbon atoms or a preponderance of normally solid fluorocarbon acid fluorides having higher molecular weights are formed. The distribution of the molecular weight of fluorocarbon acid fluorides, as well as the conversion of tetrafluoroethylene to the acid fluoride, can be varied by the ratio of the sulfur dioxide to the tetrafluoroethylene. At low ratios of 0.1 to 1.0 the conversion to the fluorocarbon acid fluoride is high and the average molecular weight of the product is also high, so that principally solid products are formed. At ratios of greater than one, the conversion to, as well as the average molecular weight of, the fluorocarbon acid fluorides formed decreases so that the reaction product comprises preponderantly liquid fluorocarbon acid fluorides having from four to twelve carbon atoms. The ratio of sulfur dioxide to tetrafluoroethylene is not critical as far as the occurrence of the reaction of the present invention is concerned, however, it is preferred, for optimum results, to maintain the ratio between 0.1 and 10. An increase in contact time of the reagents with the carbon catalyst results in the formation of fluorocarbon acid fluorides having a lower average molecular weight at higher conversions. In general, contact times will range from 0.1 to 10 seconds. A similar effect is noted with temperature. At temperatures below 450° C. primarily solid carboxylates are formed, whereas at temperatures above 450° C. liquid products are formed. The process can be carried out by a batch or a continuous method. Various methods, such as distillation or conversion to acid or acid derivatives may be employed to separate the acid fluorides.

Any type of active carbon can be employed as the catalyst in the present invention. In general, however, active carbon prepared from wood, sawdust, peat, lignite and pulpmill waste is preferred. Active carbon is obtained through carbonization of the raw material followed by an activation step which involves the controlled oxidation of the carbonized material. The preparation of active carbon is well-known in the industry and a number of active carbons are commercially available.

The invention is further illustrated by the following examples.

EXAMPLE I

Gaseous tetrafluoroethylene and sulfur dioxide were passed through separate, calibrated flow-meters and then mixed in a ratio of 1:3 and passed through a molecular sieve. The mixture was fed to a vertically mounted 36 in. by ½ in. stainless steel reaction tube heated by a tube furnace and containing a 30 x ½ in. active carbon bed supported in the tube by means of stainless steel wire gauze. The active carbon catalyst employed was 4 to 6 mesh "Columbia A.C." carbon. The reactor was maintained at a temperature of 460 to 470° C. The effluent from the reactor was passed through methanol, a wet ice trap and a 10% sodium hydroxide solution. The esters formed in the methanol were analyzed for by gas chromatography and infrared analysis. Table I summarizes the amount of tetrafluoroethylene (TFE) fed at the time that samples were taken from the reactor, the length of time in which a sample was taken and the total time of continuous reactor operation, as well as the conversion to solid and liquid product and the distribution of acid fluorides in the liquid fraction of the product. Analysis of the reaction products was carried out by gas chromatography.

Table 1

| Total Reaction Time (hrs.) | Sample Reaction Time (min.) | Weight of TFE (g.) | Weight of Ester | | Conversion of TFE | | Weight Percent of Acid Fluoride in Liquid | | | | | | | | |
|---|---|---|---|---|---|---|---|---|---|---|---|---|---|---|---|
| | | | Liquid (g.) | Solid (g.) | Liquid (Percent) | Solid and Liquid (Percent) | $C_4$ | $C_5$ | $C_6$ | $C_7$ | $C_8$ | $C_9$ | $C_{10}$ | $C_{11}$ | $C_{12}$ |
| 3.2  | 194 | 134 | 10.9 | 0.1 | 8.2 | 8.3  | 48.7 | 16.1 | 22.4 | 8.4  | 4.4  |      |      |      |      |
| 6.6  | 202 | 143 | 13.5 | 0.1 | 8.8 | 8.9  | 35.0 | 14.1 | 26.4 | 11.7 | 10.6 | 2.2  |      |      |      |
| 9.0  | 144 | 102 | 6.6  | 1.8 | 6.5 | 8.2  | 27.1 | 12.6 | 26.3 | 13.6 | 13.1 | 5.5  | 1.8  |      |      |
| 11.9 | 167 | 118 | 11.2 | 2.1 | 9.5 | 11.2 | 27.8 | 12.7 | 22.9 | 12.8 | 13.0 | 5.7  | 3.9  | 1.2  |      |
| 14.1 | 137 | 98  | 7.6  | 1.0 | 7.7 | 8.7  | 23.0 | 13.1 | 23.4 | 13.7 | 14.7 | 6.6  | 4.8  | 0.7  |      |
| 20.1 | 365 | 262 | 14.6 | 0.8 | 5.6 | 5.9  | 16.3 | 27.9 | 18.6 | 10.8 | 12.2 | 6.6  | 5.5  | 1.9  | tr.  |
| 22.0 | 112 | 80  | 2.8  | 0.9 | 3.4 | 4.6  | 15.1 | 23.1 | 18.0 | 11.6 | 14.5 | 7.7  | 7.3  | 2.7  | tr.  |
| 25.0 | 180 | 127 | 5.6  | 2.2 | 4.4 | 6.1  | 22.6 | 11.5 | 19.6 | 13.6 | 14.1 | 8.1  | 7.2  | 3.3  | tr.  |
| 29.2 | 252 | 180 | 5.1  | 4.3 | 2.8 | 5.2  | 14.4 | 20.9 | 17.2 | 12.5 | 14.8 | 9.0  | 8.2  | 3.0  | tr.  |
| 33.9 | 285 | 206 | 3.2  | 0.7 | 1.5 | 1.8  | 15.8 | 16.3 | 19.9 | 14.5 | 14.8 | 8.5  | 6.6  | 3.6  | tr.  |
| 36.4 | 142 | 100 | 1.3  | 1.9 | 1.3 | 3.4  | 10.6 | 12.7 | 15.7 | 15.5 | 14.8 | 11.0 | 10.0 | 6.0  | 3.7  |
| 39.9 | 214 | 151 | 1.0  | 0.2 | 0.7 | 0.8  | 11.0 | 22.4 | 19.7 | 14.1 | 14.0 | 9.2  | 6.6  | 3.0  | tr.  |
| 43.1 | 190 | 132 | 0.8  | 1.9 | 0.7 | 2.2  | 11.3 | 10.3 | 13.8 | 13.5 | 14.3 | 11.6 | 10.4 | 7.5  | 7.3  |
| 47.3 | 249 | 169 | 1.5  | 3.4 | 0.9 | 2.9  | 9.3  | 10.5 | 15.6 | 15.0 | 16.0 | 12.7 | 10.5 | 6.4  | 4.0  |

EXAMPLE II

Into a jet reactor comprising a 16 in. long, 2 in. diameter pipe having attached to its top a jet extending into the said tube, said jet being surrounded by two concentric tubes having I.D.'s of 0.5 and 1 in. respectively, and forming two annuli around said jet, said tubes being equipped with inlet means, was charged through calibrated flow meters, separately, chlorine trifluoride, mixed in a ratio of 1:2 with nitrogen, through the jet, 51 g. of tetrafluoroethylene through the inner annulus, and sulfur dioxide through the outer annulus. The ratio of the sulfur dioxide to the tetrafluoroethylene was 1.8, and the ratio of the tetrafluoroethylene to the chlorine trifluoride was 1.6. The temperature of the jet reactor was maintained at 466° to 477° C. The tetrafluoroethylene was charged over a period of 63 min. On reaction of the effluent gaseous product with methanol, there was isolated 2.0 g. of liquid methyl perfluorocarboxylate and 8.3 g. of solid perfluorocarboxylate corresponding to a conversion of 20.2%.

EXAMPLE III

Employing the equipment disclosed in Example I, nitrous oxide was reacted with tetrafluoroethylene in a ratio of 3:1 employing a 20 in. active "Columbia A.C." carbon bed. To the reactor was charged 80 g. of tetrafluoroethylene at a rate of 148 ml./min. for a contact time of 6.6 sec. The reactor was maintained at a temperature of 470° C. to 500° C. Analysis of the effluent on reaction with methanol showed the formation of 3.5 g. of liquid methyl perfluorocarboxylate ($C_4$ to $C_{11}$) corresponding to a conversion of 4.4%.

EXAMPLE IV

Into a 330 ml. stainless steel pressure vessel was charged 5 g. of cobalt trifluoride, 50 g. of sulfur dioxide and 24 g. of tetrafluoroethylene. The reaction vessel was agitated at autogenous pressure and at 100° C. for a period of 120 min. The reaction products were washed with water and 8 g. of solid fluorocarbon carboxylic acids were isolated.

As is apparent from the illustrated examples, the process of the present invention may be carried out over a wide range of conditions by various methods. The examples are not to be construed as limiting the invention, various embodiments, apparent to those skilled in the art, being included in the process discovered. The acid fluorides obtained by the process of the present invention are readily converted to the corresponding acids, salts, esters, amides and other acid derivatives according to known procedures. The industrial utility of the acids and acid derivatives obtained by the process of the present invention has been well established in the literature.

I claim:

1. Process for the preparation of fluorocarbon acid fluorides which comprises contacting a mixture of tetrafluoroethylene and a compound selected from the class consisting of sulfur dioxide and nitrous oxide with a free radical catalyst selected from the group consisting of active carbon, cobalt trifluoride and chlorine trifluoride at a temperature of 100 to 550° C.

2. Process for the preparation of fluorocarbon acid fluorides which comprises contacting a mixture of tetrafluoroethylene and a compound selected from the class consisting of sulfur dioxide and nitrous oxide with active carbon at a temperature of 400° to 550° C.

3. A process as set forth in claim 2 wherein the tetrafluoroethylene is contacted with sulfur dioxide.

4. The process as set forth in claim 3 wherein the ratio of the sulfur dioxide to the tetrafluoroethylene is from 0.1 to 10.

References Cited in the file of this patent

UNITED STATES PATENTS

| 2,790,815 | Brice et al. | Apr. 30, 1957 |
| 2,863,916 | Clarke et al. | Dec. 9, 1958 |
| 2,927,941 | Bruce | Mar. 8, 1960 |